United States Patent [19]

Werner et al.

[11] Patent Number: 4,708,392

[45] Date of Patent: Nov. 24, 1987

[54] HINGE JOINT FOR THE SEATS OF AUTOMOTIVE VEHICLES AND THE LIKE

[75] Inventors: Heinz Werner, Remscheid; Hansjörg Walk, Reutlingen, both of Fed. Rep. of Germany

[73] Assignee: Keiper Recaro GmbH & Co., Remscheid, Fed. Rep. of Germany

[21] Appl. No.: 881,225

[22] Filed: Jul. 2, 1986

[30] Foreign Application Priority Data

Jul. 2, 1985 [EP] European Pat. Off. ........ 85108180.2

[51] Int. Cl.⁴ .............................................. B60N 1/02
[52] U.S. Cl. .................................... 297/362; 297/355; 297/361
[58] Field of Search ................ 297/354, 355, 362, 361; 74/804, 805

[56] References Cited

U.S. PATENT DOCUMENTS

| | | | |
|---|---|---|---|
| 4,025,109 | 5/1977 | Klingelhöfer et al. | 297/362 X |
| 4,402,547 | 9/1983 | Weston et al. | 297/362 X |
| 4,453,767 | 6/1984 | Walk et al. | 297/362 |

FOREIGN PATENT DOCUMENTS

| | | | |
|---|---|---|---|
| 0099549 | 2/1984 | European Pat. Off. | 297/362 |
| 2834707 | 12/1979 | Fed. Rep. of Germany | 297/362 |
| 2107386 | 4/1983 | United Kingdom | 297/362 |

*Primary Examiner*—James T. McCall
*Attorney, Agent, or Firm*—Peter K. Kontler

[57] ABSTRACT

The back of the seat in a motor vehicle is connected to the base of the seat by a shaft which has a cylindrical eccentric of lesser eccentricity and a frustoconical eccentric of more pronounced eccentricity. The base has a first gear with a first internal surface surrounding the cylindrical eccentric and a second internal surface surrounding the second eccentric. One or more teeth of the first gear mate with the teeth of an internal gear on the back. The shaft is journalled in the back and can be rotated by a handle to thereby change the inclination of the back relative to the base. The second surface is movable axially of the shaft and is biased in such a direction by one or more springs to bear against the surface of the frustoconical eccentric. The cylindrical eccentric is effective during the initial stage of angular movement of the shaft for the purpose of changing the inclination of the back.

22 Claims, 13 Drawing Figures

HINGE JOINT FOR THE SEATS OF AUTOMOTIVE VEHICLES AND THE LIKE

CROSS-REFERENCE TO RELATED CASE

The hinge joint of the present invention is similar to that which is disclosed in the commonly owned U.S. Pat. No. 4,563,039 to Jörg and in the commonly owned copending patent application Ser. No. 881,195 filed July 2, 1986.

BACKGROUND OF THE INVENTION

The present invention relates to hinge joints in general, and more particularly to improvements in hinge joints which can be used with advantage in the seats of motor vehicles or the like, for example, to pivotally and adjustably connect the back to the lower portion of a seat. Still more particularly, the invention relates to improvements in hinge joints of the type wherein a second component is pivotably connected to a first component by a coupling device including a shaft which is rotatably journalled in one of the components and can be rotated by a hand wheel, by a lever or the like, a gear train including mating gears which are provided on the two components and surround the shaft, and an eccentric which is provided on the shaft and can move the gear on one of the components radially into more or less pronounced mesh with the other gear.

The eccentric can constitute the frustum of a cone which is integral with the shaft and is surrounded by a complementary frustoconical internal surface of one of the gears. It is further known to bias the eccentric and/or the one gear axially so as to maintain the internal surface in contact with the eccentric. Reference may be had to the commonly owned European patent application Ser. No. 0 048 294 to Walk et al. which discloses a hinge joint wherein the frustoconical internal surface is provided in a spur gear which is rigid or integral with the stationary component of the hinge joint. The shaft is rotatably and axially movably journalled in a disc which is riveted to the spur gear of the stationary component. The shaft is further rotatably and axially movably journalled in an end plate which is rigidly connected to the pivotable component, and the shaft is biased axially by a dished spring so as to maintain the frustoconical internal surface of the spur gear in contact with the periphery of the frustoconical eccentric. The purpose of the spring is to ensure that the spur gear mates with the internal gear of the pivotable component without play. To this end, the internal surface is in static frictional engagement with the eccentric when the pivotable component of the hinge joint is held in a selected position so that the spring cooperates with the spur gear and with the eccentric to eliminate play between the gears of the two components as well as to eliminate play in the bearings between the components and the shaft. Static friction is reduced to sliding friction as soon as the shaft is positively rotated by a hand wheel, by a lever or in another way in order to change the inclination of the pivotable component. At such time, the force which is generated by the spring and acts upon the eccentric in the axial direction of the shaft is opposed by the axial component of the force which is attributable to eccentricity of the eccentric and has a component acting in the axial direction of the shaft counter to the direction of action of the spring force. The eccentric is then caused to move axially of the surrounding frustoconical internal surface against the opposition of the spring to thus allow for a reduction of the force which is required to rotate the shaft in order to change the inclination of the second component. It has been found that the eccentric is likely to move axially to such an extent that it bears against a stop and thereby generates frictional forces which must be overcome by the person rotating the shaft. Such additional or excessive axial shifting of the eccentric is likely to take place under the weight of the back of a seat which embodies the hinge joint and/or in response to the action of the force with which the occupant of the seat in a motor vehicle leans against the back of the seat. The generation of such additional forces renders it more difficult to manually adjust the inclination of the back and renders it necessary to expend more energy if the inclination of the back of a seat is changed by a motor.

OBJECTS AND SUMMARY OF THE INVENTION

An object of the invention is to provide a hinge joint wherein the radial play between the two components of the joint is eliminated and which is constructed and assembled in such a way that the inclination of the pivotable component relative to the other component can be altered in response to the exertion of a relatively small force.

Another object of the invention is to provide a hinge joint wherein the frustoconical eccentric of the means for movably coupling the second component to the first component need not be moved axially into engagement with a stop regardless of the magnitude of forces which are applied to the second component in the course of an adjusting operation.

An additional object of the invention is to provide a hinge joint wherein the shaft of the coupling means between the two components of the joint is configurated and mounted in a novel and improved way.

Still another object of the invention is to provide a hinge joint wherein the gear on the stationary component of the joint is constructed and assembled in a novel way.

A further object of the invention is to provide a seat which embodies the above outlined hinge joint.

Another object of the invention is to reduce friction which opposes rotation of the eccentric on a shaft which must be rotated in order to change the inclination of the second component of the joint with reference to the first component.

An additional object of the invention is to provide a motor vehicle with one or more seats embodying the above outlined hinge joint.

The invention resides in the provision of a hinge joint, particularly a hinge joint which can be used between a stationary and a pivotable part of a seat in a motor vehicle. The improved hinge joint comprises a first component which can constitute the stationary base of a seat, a second component which can constitute a pivotable back of the seat, and means for pivotally coupling the second component to the first component. The coupling means includes a shaft which is rotatably journalled in one of the components, a first gear which is provided on the first component and surrounds the shaft, a second gear which is provided in the second component and mates with the first gear and surrounds the shaft, a substantially cylindrical first eccentric which is provided on the shaft, and a substantially frustoconical second eccentric which is also provided on the shaft. One of the gears has a first internal surface surrounding the first eccentric and a substantially frustoconical second internal surface which surrounds the second eccentric. The coupling means further comprises means for biasing the second eccentric and the second surface against each other in the axial direction of the shaft. The eccentricity of the second eccentric preferably exceeds the eccentricity of the first eccentric. The first surface preferably includes a first portion having a radius corresponding to the radius of the first eccentric and a second portion which is disposed substantially diametrically opposite the first portion and has a radius which at least matches but preferably exceeds the radius of the first eccentric.

In accordance with one embodiment of the invention, the second eccentric has a smaller-diameter end which is immediately adjacent the first eccentric. Such smaller-diameter end has a first portion which merges preferably gradually into the first eccentric and a second portion which is disposed opposite the first portion and extends radially outwardly beyond the first eccentric.

The arrangement may be such that the first gear surrounds the first and second eccentrics and the first and second internal surfaces are then provided in the first gear. The first surface can be fixed relative to the second surface and can be immediately or closely adjacent to the second surface.

The one gear can include a toothed first section, a substantially disc-shaped second section and means (for example, a set of rivets) for securing the second section to the first section. The first surface is then provided in the first section and the second surface is then provided in the second section.

The one gear can be provided with an integral hub which defines the second surface.

In accordance with a different embodiment of the invention, the second eccentric has a smaller-diameter end and a larger-diameter end. The larger-diameter end of such eccentric is or can be immediately adjacent the first eccentric. The one gear of the coupling means in such hinge joint can include a first annular section and a second annular section which is movably mounted on the first annular section. The first surface is then provided in the first annular section and the second surface is provided in the second annular section. At least a portion on the second annular section can be arranged to move toward and away from the first section in the axial direction of the shaft, and the biasing means can comprise means for biasing the second section in a direction to urge the second section against the second eccentric. The coupling means of such hinge joint can further comprise a plurality of tie rods which are provided in or on the first annular section of the one gear in parallelism with the shaft. The second annular section is preferably reciprocable along the tie rods, and the tie rods are preferably arranged to hold the second annular section against rotation relative to the first annular section. The biasing means can comprise springs which react against the heads of the tie rods and bear against the second annular section.

The one gear can comprise an antifriction bearing (for example, a ball or roller bearing), and the first surface can be provided in such bearing. The one gear can further comprise a sleeve which defines the second surface and the bearing can be installed in the sleeve.

The one gear can comprise an annulus of rolling elements, and the first surface can be defined by such rolling elements.

Still further, the one gear can comprise an annular insert which defines the second surface. The insert can contain or consist of a plastic material or a sintered metal.

The movable second section of the one gear can constitute a wobble plate which defines the second surface. The first section of the one gear can further comprise a cage for the second section and the biasing means can comprise means for biasing the wobble plate of the second section substantially in the axial direction of the shaft and against the second eccentric. The second eccentric of such hinge joint can comprise a larger-diameter base and a smaller-diameter end portion which is remote from the base. The biasing means can comprise a substantially conical coil spring which reacts against the first section of the one gear and bears against the second section to urge the second section toward the larger-diameter base of the second eccentric.

The second section of the one gear can include an annulus of levers having radially outermost portions which are pivotally connected to the first section of the one gear and radially innermost portions which define the second surface. The biasing means of such hinge joint preferably comprises means for biasing the radially innermost portions of the levers against the second eccentric. The first surface is provided in the first section of the one gear. The coupling means of such hinge joint can further comprise tie rods for the levers. The tie rods are rigid with the first section of the one gear and parallel to the shaft. The levers are reciprocable along and can also pivot relative to the corresponding tie rods. The biasing means of such hinge joint can comprise discrete springs which react against the tie rods and bear upon the corresponding levers.

The novel features which are considered as characteristic of the invention are set forth in particular in the appended claims. The improved hinge joint itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
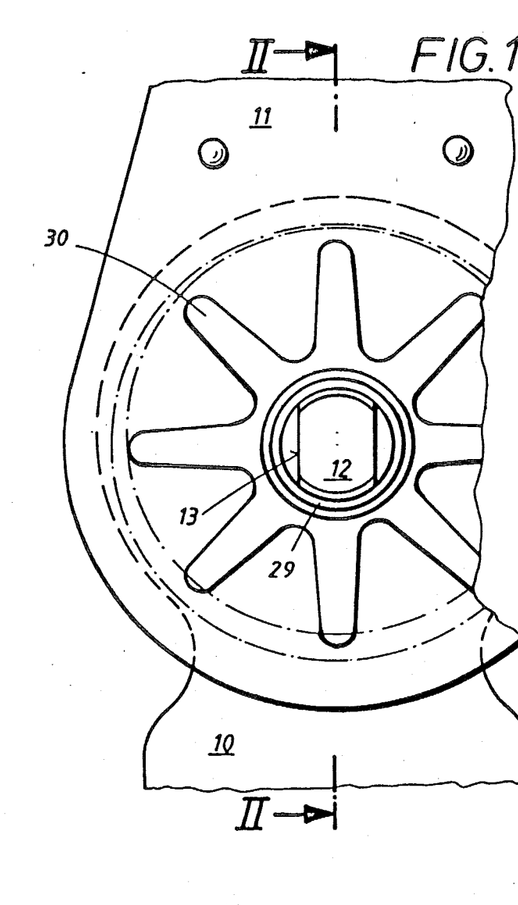
FIG. 1 is an end elevational view of a hinge joint which embodies one form of the invention and is used to establish an adjustable connection between the lower portion and the pivotable back of a seat in a motor vehicle, the means for rotating the shaft having been omitted for the sake of clarity.
Figure 2:
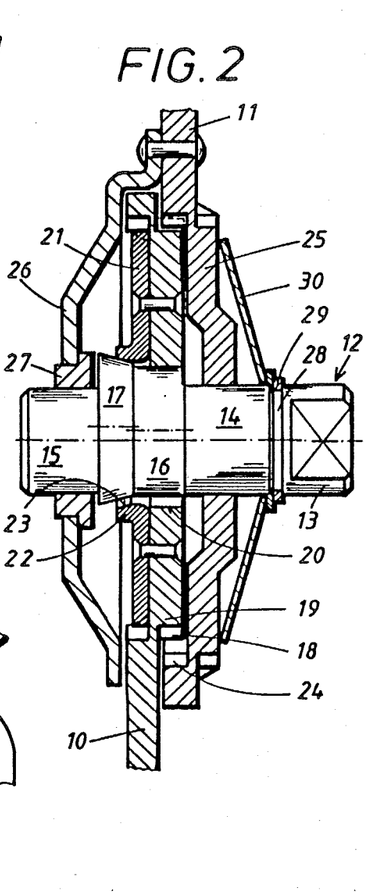
FIG. 2 a sectional view as seen in the direction of arrows from the line II—II of FIG. 1, showing the shaft in the course of angular adjustment of the second component.
Figure 3:
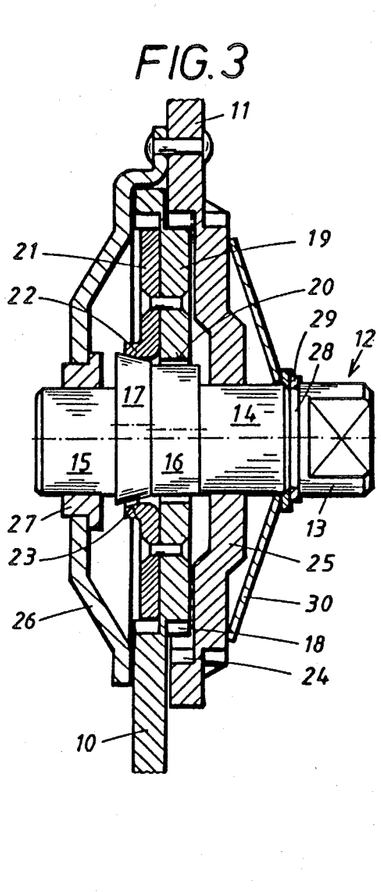
FIG. 3 shows the structure of FIG. 2 but with the shaft in its starting position.

FIGS. 1 to 3 show a hinge joint which can be installed in the seat of a motor vehicle to pivotally connect the back to the stationary lower part of the seat. The back can be mounted on two hinge joints of the type shown in FIGS. 1 to 3, one at each side of the seat. The base or lower portion of the seat carries or comprises a fixed first component or leaf 10 of the joint, and the back of the seat includes or carries a pivotable second component or leaf 11. Such components are connected to each other by a coupling device including a horizontal coupling element in the form of a shaft 12 having an exposed end portion 13 which can be engaged by a hand wheel, by a lever or by any other torque transmitting means so as to rotate the shaft relative to the first component 10. The end portion 13 has two flats which are disposed diametrically opposite each other and can be engaged by complementary flats on the aforementioned hand wheel, lever or the like to ensure that the implement can rotate the shaft 12 in the desired direction.

The shaft 12 further comprises two coaxial cylindrical portions 14 and 15 which are rotatably journalled in the pivotable component 11. The cylindrical portions 14 and 15 flank a cylindrical first eccentric 16 and a frustoconical second eccentric 17 of the shaft 12. The eccentricity of the second eccentric 17 relative to the cylindrical portions 14, 15 of the shaft 12 slightly exceeds the eccentricity of the cylindrical eccentric 16. The eccentrics 16 and 17 are immediately adjacent to each other, as seen in the axial direction of the shaft 12. In the embodiment of FIGS. 1 to 4, 8 and 9, the smaller-diameter end portion of the frustoconical eccentric 17 is immediately adjacent the respective axial end of the cylindrical eccentric 16. The transition between the eccentrics 16 and 17 is such that the eccentric 17 merges into the eccentric 16 substantially gradually in the region where the eccentricity of the eccentrics 16, 17 relative to the cylindrical portions 14, 15 of the shaft 12 is zero or closest to zero, and that the eccentricity of the portion of the eccentric 17 which is disposed opposite the just defined location exceeds the eccentricity of the eccentric 16. With reference to FIG. 2, the eccentricity of the upper portion of the eccentric 17 exceeds the eccentricity of the upper portion of the eccentric 16 but the lower portion of the eccentric 17 merges substantially gradually into the lower portion of the eccentric 16. The difference between the eccentricities of the upper portions (as seen in FIG. 2) of the eccentrics 16 and 17 equals twice the difference between the eccentricities of the eccentrics 16, 17 relative to the cylindrical portions 14, 15 of the shaft 12. The eccentric 17 slopes radially outwardly and away from the axis of the shaft 12 in a direction away from the eccentric 16.

The component 10 of the hinge joint comprises an integral spur gear 18 which constitutes a depressed portion of the component 10 and includes a toothed annular first section 19 and a disc-shaped annular second section 21 which is secured to the section 19 by a set of rivets or other suitable fasteners. The first section 19 of the gear 18 has a substantially cylindrical internal surface 20 which surrounds the cylindrical eccentric 16 of the shaft 12. The disc-shaped section 21 of the gear 18 has a hub 22 which defines a frustoconical internal surface 23 surrounding the frustoconical eccentric 17 of the shaft 12. The internal surface 20 of the section 19 includes a first portion whose radius matches or closely approximates the radius of the cylindrical eccentric 16, and a second portion which is disposed diametrically opposite the first portion and has a radius which at least matches but preferably at least slightly exceeds the radius of the eccentric 16. The internal surface 23 of the hub 22 of the disc-shaped second section 21 surrounds the frustoconical eccentric 17 with a certain amount of play which can be seen in the lower portions of FIGS. 2 and 3.

The second component 11 has an internal gear 24 having teeth which mate with one or more teeth of the first section 19 of the spur gear 18 on the component 10. The internal teeth of the gear 24 are disposed radially outwardly of a substantially disc-shaped central portion 25 of the component 11. The portion 25 surrounds the cylindrical portion 14 of the shaft 12. The portion 15 of the shaft 12 is surrounded by a collar 27 which is inserted into an end plate 26. This end plate is riveted to the component 11. A diaphragm spring 30 reacts against a split ring 29 on the shaft 12 and bears against the outer side of the central portion 25 of the component 11 so as to urge the hub 22 of the disc-shaped second section 21 of the gear 18 against the frustoconical eccentric 17. The split ring 29 is inserted into a circumferential groove 28 of the shaft 12 between the shaft portions 13 and 14. The play between the portion 25 of the component 11 and the shaft portion 14 is preferably negligible or minimal. The collar 27 is optional, i.e., the radially innermost portion of the end plate 26 can directly surround the shaft portion 15. The prongs of the diaphragm spring 30 urge the component 11 against the component 10 so that the internal surface 23 of the hub 22 is held in contact with the eccentric 17 of the shaft 12.

The number of external teeth on the first section 19 of the gear 18 is less than the number of internal teeth of the gear 24 of the component 11. For example, the number of teeth on the gear 24 can exceed the number of teeth on the section 19 of the gear 18 by one or by another whole number. The diameter of the addendum circle of the spur gear 18 is less than the diameter of the root circle of the internal gear 24, and the difference between such diameters at least matches the height of a tooth on the gear 19, namely the distance between the root portion and the top land of such tooth.

The eccentricity of the cylindrical eccentric 16 relative to the cylindrical portions 14 and 15 of the shaft 12 corresponds to the difference between the radius of the root circle of the internal gear 24 and the radius of the addendum circle of the spur gear 18. The eccentricity of the frustoconical eccentric 17 relative to the cylindrical portions 14, 15 of the shaft 12 slightly exceeds the eccentricity of the eccentric 16 relative to such cylindrical portions.

When the shaft 12 is to be rotated by a hand wheel or the like, it is likely to move axially relative to the component 11 due to unavoidable tolerances in the machining of the cylindrical shaft portions 14, 15 on the one hand and due to the development of radial forces between the teeth of the gears 18 and 24. Such axial movement of the shaft 12 takes place against the opposition of the diaphragm spring 30. Actual axial displacement of the shaft 12 relative to the component 11 against the opposition of the spring 30 will take place only when the magnitude of the aforementioned forces exceeds a predetermined threshhold value. Such axial shifting of the shaft 12 depends on tolerances with which the parts of the hinge joint are machined and allows for radial movability of certain parts of the joint in a positive as well as in a negative sense. This renders it possible to adjust the inclination of the component 11 (a) without any wobbling of the parts constituting the coupling device between the components 10 and 11, and (b) with the exertion of a relatively small force.

When the angular displacement of the shaft 12 is terminated, sliding friction between the internal surface 23 of the hub 22 and the external surface of the eccentric 17 is replaced by static friction so that the mutual positions of the components 10, 11 and of their gears 18, 24 remain unchanged without any play between the gears. These conditions prevail as long as the component 11 remains in a selected angular position. This will be readily appreciated by bearing in mind that the conicity of the eccentric 17 and of the adjacent internal surface 23 can be readily selected in such a way that the surface 23 and the peripheral surface of the eccentric 17 produce a self-locking action as soon as the intentional angular displacement of the shaft 12 is terminated. This ensures that the inclination of the second component 11 cannot be changed by applying a tilting force to such component, i.e., the inclination of the component 11 can be changed only in response to the intentional application of torque to the shaft 12. Such application of torque entails a conversion of static friction between the neighboring surfaces of the hub 22 and eccentric 17 into sliding friction.

The angular position of the shaft 12 in FIG. 2 is identical with that of the shaft 12 in FIG. 3. However the radial position of the gear 18 relative to the gear 24 is different due to a different axial position of the shaft 12 relative to the components 11 and 12, i.e., the bias of the diaphragm spring 30 in FIG. 12 is more pronounced than in FIG. 3.

Any forces which are applied to the component 11 in addition to those forces which are attributable to the weight of the back of the seat act upon the component 11 to move it radially relative to the component 10. Such forces act upon the mating teeth of the gears 18 and 24. An important function of the cylindrical eccentric 16 is to take up such additional forces by forming with the first section 19 of the gear 18 an additional bearing which is capable of taking up the additional forces and of preventing excessive axial displacement of the shaft 12 relative to the components 10, 11 and/or vice versa. The provision of the cylindrical eccentric 16 in addition to the frustoconical eccentric 17 renders it possible to ensure that the radial forces which act at the locus of mesh between the teeth of the gears 18 and 24 entail an axial shifting of the shaft 12 when the shaft is positively rotated by a hand wheel or the like. The eccentric 17 is then shifted axially as well as radially until the internal surface 20 of the section 19 engages the peripheral surface of the eccentric 16. Any additional radial forces are then taken up by the cylindrical eccentric 16 and by the surface 20 of the section 19 without necessitating or entailing any additional axial shifting of the shaft 12 and its eccentrics 16, 17. Radial shifting is possible because the cylindrical eccentric 16 supports the gear section 19 only at that side of the gear 18 where the teeth of the section 19 mate with the teeth of the internal gear 24. Consequently, the play between the eccentric 16 and the section 19 can increase at the opposite side of the eccentric 16 (see the lower portion of the eccentric 16 in FIG. 2). The aforediscussed configuration of a portion of the internal surface 20 renders it possible that the eccentric 16 and the gear 18 can move radially relative to each other.

The placing of the smaller-diameter end of the eccentric 17 into immediate proximity of the respective axial end of the eccentric 16 contributes to compactness of the hinge joint and simplifies the assembly of its parts.

Figure 4:
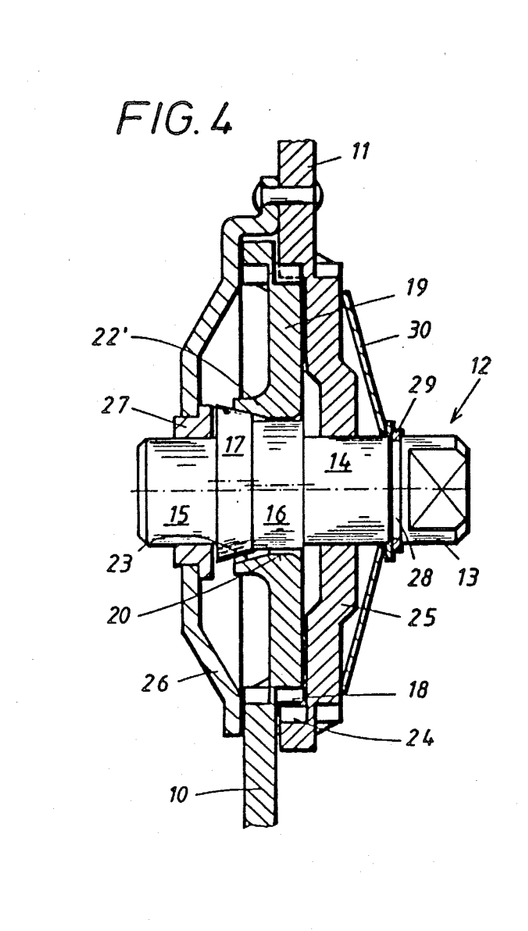
FIG. 4 is a fragmentary sectional view of a hinge joint wherein the spur gear of the first component has an integral hub defining the frustoconical second surface.

FIG. 4 illustrates a modified hinge joint wherein the separately produced disc-shaped section 21 of the gear 18 on the fixed component 10 is replaced by an integral hub 22' of the toothed first section 19 of the gear 18. The frustoconical internal surface 23 is defined by the hub 22'. In all other respects, the construction of the hinge joint of FIG. 4 is or can be identical or analogous to the construction of the hinge joint of FIGS. 1 to 3. The internal surface 20 is defined by the section 19 of the gear 18.

Figure 5:
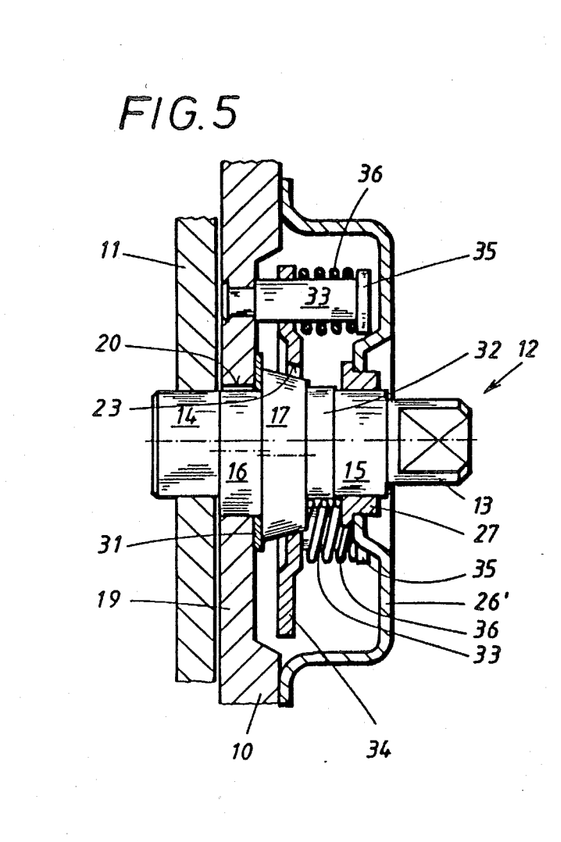
FIG. 5 is a sectional view of a hinge joint wherein the gear of the first component comprises a disc-shaped section which is movable in the axial direction of the shaft.

FIG. 5 shows a third hinge joint wherein the cylindrical eccentric 16 is adjacent to the larger-diameter end or base of the frustoconical eccentric 17. The surface 20 is provided in the first section 19 of the gear on the component 10, and the second section of such gear includes a disc-shaped member 34 which defines the frustoconical internal surface 23 surrounding the eccentric 17 and being reciprocable along a set of, for example, three equidistant tie rods 33 in the form of rivets anchored in the section 19 and extending in parallelism with the shaft 12. The diaphragm spring 30 of FIGS. 1 to 4 is replaced with a set of discrete coil springs 36 which surround the shanks of the tie rods 33 and react against the heads 35 of the respective tie rods. The coil springs 36 bear against the disc 34 and urge its internal surface 23 into engagement with the eccentric 17. A washer 31 is inserted between the base of the frustoconical eccentric 17 and the adjacent side of the section 19 of the spur gear on the component 10. The construction of the components 10 and 11 is or can be the same as in the embodiments of FIGS. 1 to 4, i.e., the component 11 is provided with an internal gear one or more teeth of which mate with one or more teeth of the spur gear including the sections 19 and 34.

The shaft 12 of the coupling means in the hinge joint of FIG. 5 further comprises a cylindrical distancing portion 32 which is disposed between the cylindrical portion 15 and the eccentric 17. The shoulder between the distancing portion 32 and the cylindrical portion 15 of the shaft 12 can move into abutment with a collar 27 of the cup-shaped end plate 26' replacing the end plate 26 of the embodiments shown in FIGS. 1 to 4. The collar 27 surrounds the cylindrical portion 15 on the shaft 12, and the central portion of the component 11 surrounds the cylindrical portion 14 of the shaft. The end plate 26' is riveted, bolted or otherwise affixed to the component 11. The shaft 12 of FIG. 5 is held against axial movement relative to the components 10 and 11 but can rotate about its axis. This is the reason that the section 34 of the component 10 is movable in the axial direction of the shaft 12. Axial movability of the section 34 renders it possible to eliminate any radial play between the components 10 and 11. The tie rods 33 ensure that the section 34 cannot rotate relative to the section 19 of the gear on the component 10. The axis of the frustoconical internal surface 23 of the section 34 coincides with the axis of the internal surface 20 in the section 19. The bias of the coil springs 36 suffices to ensure that the surface 23 is maintained in contact with the external surface of the eccentric 17.

The mode of operation of the hinge joint of FIG. 5 is substantially identical to the mode of operation of the aforedescribed hinge joints. The main difference is that the shaft 12 cannot move axially; instead, the section 34 of the gear on the component 10 is movable axially of the shaft under the bias, or against the opposition, of the coil springs 36. When the shaft 12 is not positively rotated, sliding friction between the eccentric 17 and the component 34 is replaced by static friction and the eccentric 17 does not generate a component of force in the axial direction of the shaft 12. The springs 36 maintain the section 34 in an axial position such that the teeth of the gear on the component 10 cannot wobble or perform any other stray movements relative to the teeth of the internal gear on the component 11 and/or vice versa. The function of the cylindrical eccentric 16 is the same as that of the similarly referenced eccentric in the embodiment of FIGS. 1 to 3 or in the embodiment of FIG. 4. The springs 36 bias the section 34 axially toward the larger-diameter end or base of the frustoconical eccentric 17.

Figure 6:
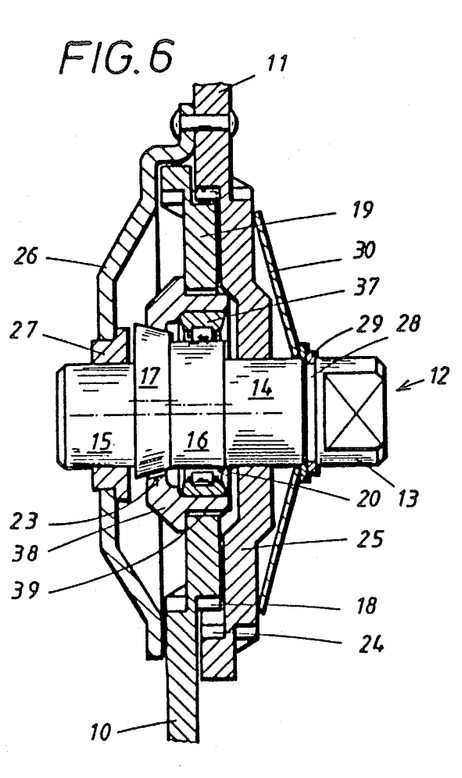
FIG. 6 is a sectional view of a hinge joint wherein the first internal surface is defined by an antifriction bearing of the spur gear on the first component.

FIG. 6 shows a further hinge joint wherein the second section of the gear 18 on the fixed component 10 includes a ring-shaped sleeve 38 having a frustoconical internal surface 23 surrounding the frustoconical eccentric 17 of the shaft 12. The cylindrical internal surface 20 is defined by the rolling elements of an antifriction roller bearing 37 which is installed in the section 38 and is surrounded by the section 19 of the spur gear 18. The mutual positions of the eccentrics 16 and 17 on the shaft 12 are the same as in the embodiments of FIGS. 1 to 4. The sleeve-like section 38 can be a press fit in the section 19. Alternatively, the connection between the sections 19 and 38 of the gear 18 can include a so-called channel toothing 39 or the like. All that counts is to ensure that the section 38 need not rotate relative to the section 19 of the gear 18. The rolling elements of the bearing 37 are held in a suitable cage (not shown in detail) so that they define the surface 20 which contacts the peripheral surface of the cylindrical eccentric 16 on the shaft 12. A portion of the internal surface 20 is flattened in the aforedescribed manner so as to ensure that the shaft 12 and the component 10 can perform the required radial movements in order to eliminate radial play between the teeth of the gears 18 and 24. The axis of the internal surface 23 preferably coincides with the axis of the bearing 37.

The hinge joint of FIG. 6 renders it possible to reduce the actuating torque because any radial forces which are generated in addition to the weight of the back of the seat embodying the hinge joint of FIG. 6 are taken up by the bearing 37. Consequently, the angular position of the shaft 12 can be changed with the exertion of a relatively small force. Forces which develop between the mating teeth of the gears 18 and 24 during rotation of the shaft 12 entail an axial shifting of the shaft and of the bearing for the section 19 of the gear 18 with resulting movement of the gear 18 in the radial direction to such an extent that the bearing 37 engages the cylindrical eccentric 16 of the shaft 12. This enables the bearing 37 to take up the forces which develop during rotation of the shaft 12. Radial shifting of the bearing 37 relative to the shaft 12 and/or vice versa is possible because only a portion of the eccentric 16 is engaged by the rolling elements of the bearing 37, namely at that side of the shaft 12 where the eccentric 16 extends radially beyond the adjacent cylindrical portion 14. Such portion of the eccentric 16 is nearest to the location of mesh between one or more teeth of the gear 18 and one or more teeth of the gear 24. Since the eccentricity of the eccentric 17 relative to the shaft portions 14, 15 deviates from the eccentricity of the eccentric 16, the shaft 12 is shifted axially whenever it is set in rotary motion to thus ensure that the angular displacement of the shaft can be effected in response to the exertion of a relatively small force. The shaft 12 is moved axially as soon as its angular displacement is terminated to ensure that the eccentric 17 eliminates any radial play between the teeth of the gears 18 and 24.

The provision of the bearing 37 renders it possible to reduce friction which develops between the surface 20 and the eccentric 16 when the shaft 12 is set in rotary motion. Relatively large frictional forces are likely to develop if the user of the seat leans against the back of the seat with a pronounced force while the shaft 12 is being rotated by a hand wheel or the like. It is equally within the purview of the invention to provide the bearing 37 with an inner race which is adjacent to the eccentric 16 and defines the internal surface 20.

Figure 7:
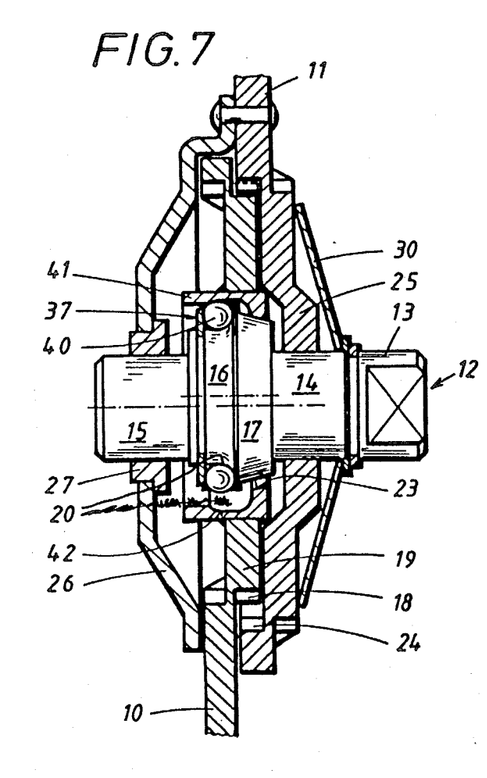
FIG. 7 is a sectional view of an additional hinge joint wherein the second internal surface is defined by spherical rolling elements.

FIG. 7 shows a hinge joint wherein the surface 20 is defined by the rolling elements 40 of an antifriction bearing 37 which is installed in an annular insert 41 constituting the second section of the gear 18 on the fixed component 10. The rolling elements 40 of the bearing 37 are in direct contact with the eccentric 16 of the shaft 12. The arrangement is such that the bearing 37 is held against axial movement relative to the shaft 12 and vice versa. This is achieved by the utilization of a split ring which holds the bearing 37 on the shaft 12 in the illustrated axial position. The insert 41 includes a portion which is welded or otherwise rigidly secured to the first section 19 of the gear 18 and defines the frustoconical internal surface 23 surrounding the eccentric 17 of the shaft 12. The insert 41 defines an internal track 42 for the rolling elements 40 so as to allow for axial shifting of the shaft 12 and gear 18 relative to each other. Such axial shifting takes place under or against the bias of the diaphragm spring 30 which is mounted in the same way as in the embodiment of FIG. 1. The inner diameter of the left-hand portion of the insert 41 (namely, of the track 42) exceeds the outer diameter of the annulus of rolling elements 40. FIG. 7 shows the shaft 12 during angular displacement, namely during adjustment of the inclination of the component 11 relative to the component 10. When such angular displacement on the shaft 12 is completed, the shaft remains in the selected angular position and the teeth of the gears 18 and 24 are held in mesh without any play.

The provision of an annulus of rolling elements 40 in direct contact with the insert 41 and with the cylindrical eccentric 16 contributes to simplicity of the hinge joint of FIG. 7 and ensures that the eccentric 16 is held against axial movement relative to the rolling elements.

Figure 8:
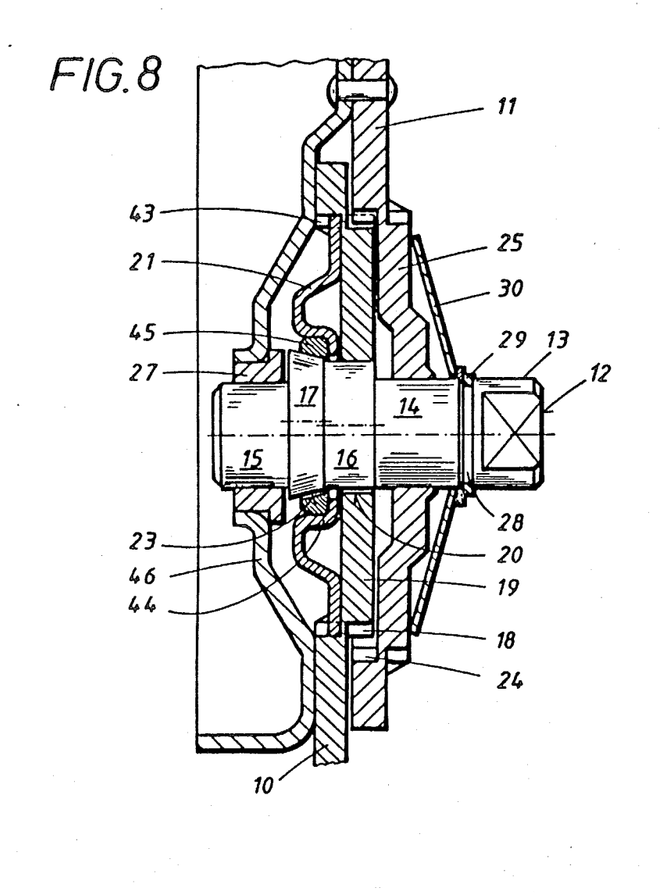
FIG. 8 is a sectional view of a hinge joint wherein the second surface is defined by an insert which contains a sintered metal or a plastic material.

FIG. 8 shows a hinge joint which is analogous to the hinge joint of FIGS. 1 to 3. One of the main differences is a different configuration of the disc-shaped second section 21 of the gear 18 on the component 10. The section 21 carries an annular insert 45 which can be made of a sintered metal or a plastic material and defines the frustoconical internal surface 23 surrounding the frustoconical eccentric 17 of the shaft 12. The section 21 is a thin-walled pressing or stamping made of sheet metal or the like. The periphery of the section 21 is formed with an annulus of teeth which engage the passive teeth 43 of the spur gear 18, namely the teeth which are formed automatically in response to depression of the central portion of the component 10 so as to form the annular section 19 of the gear 18. The insert 45 is confined in a suitably configured collar 44 constituting the radially innermost portion of the section 21. The selection of material for the insert 45 will depend on the desired friction coefficient between the insert and the eccentric 17 of the shaft 12. It is equally possible to use an insert 45 which is an integral part of the disc-shaped section 21, i.e., the section 21 can be made of a sintered metal or from a suitable plastic material which exhibits the desirable friction coefficient.

Another difference between the embodiments of FIGS. 1 to 3 on the one hand and the embodiment of FIG. 8 on the other hand is that in FIG. 8 the end plate of the second component 11 is constituted by a bracket 46 forming part of or connected to the back of the seat in which the improved hinge joint is installed. The seat comprises two brackets 46, one at each side of the fixed component 10. The connection between the bracket 46 and the major part of the component 11 can include a set of rivets one of which is shown in the upper portion of FIG. 8.

The embodiment of FIG. 8 exhibits the advantage that the wear upon the second section of the gear 18 can be selected practically at will by appropriate selection of the material and dimensions of the annular insert 45.

Figure 9:
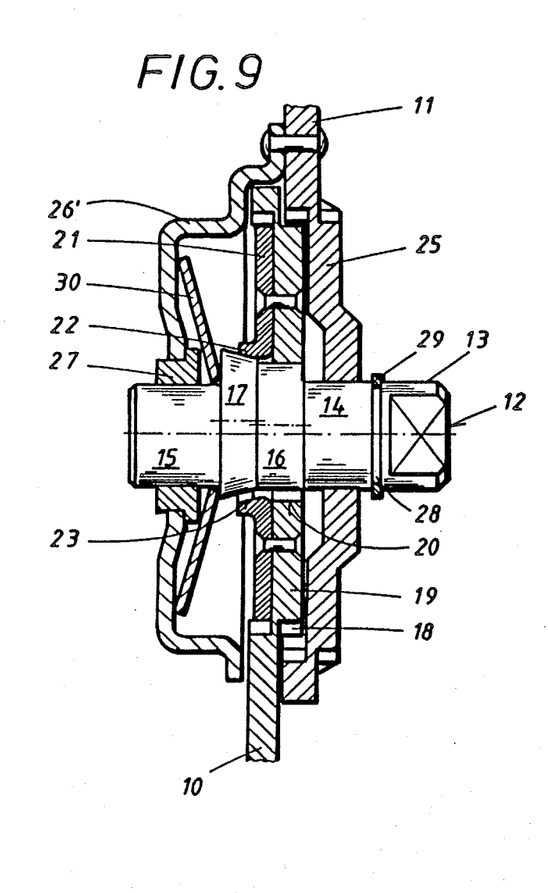
FIG. 9 a sectional view of a hinge joint wherein the second eccentric is biased against the second surface of the one gear by a diaphragm spring installed between the two components.

FIG. 9 shows a hinge joint which employs a cupped end plate 26' secured to the main portion of the second component 11 by a set of rivets. The end plate 26' confines the diaphragm spring 30 which reacts against the bottom wall of the end plate 26' and bears against the end face at the larger-diameter end or base of the eccentric 17 on the shaft 12. The split ring 29 on the shaft 12 serves as a stop which limits the extent of axial movability of the shaft in one direction, namely in a direction to the left as seen in FIG. 9. In all other respects, the hinge joint of FIG. 9 is, or can be identical or analogous, to the hinge joint of FIGS. 1 to 3.

Figure 10:
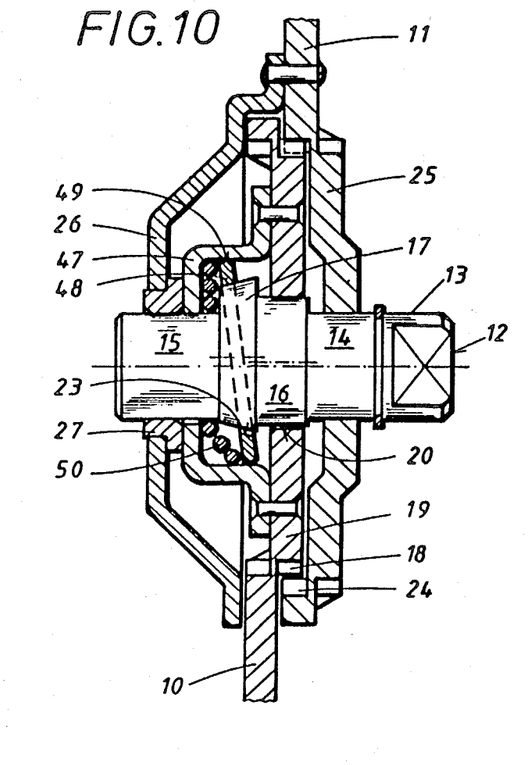
FIG. 10 is a sectional view of a hinge joint wherein the gear of the first component comprises a wobble plate which surrounds the frustoconical eccentric on the shaft.

FIG. 10 shows a further hinge joint wherein the second section 48 of the gear 18 constitutes a wobble plate surrounding the frustoconical eccentric 17 of the shaft 12 and being confined in a cage 47 which forms part of or is rigidly secured to the first section 19 of the gear 18 on the stationary first component 10. The wobble plate 47 is biased in the axial direction of the shaft 12 toward the larger-diameter end of the eccentric 17 by a conical coil spring 50 which reacts against the bottom wall of the cage 47. The peripheral surface 49 of the wobble plate 48 is in contact with the internal surface of the cylindrical portion of the cage 47. The frustoconical internal surface 23 of the wobble plate 48 contacts certain portions of the external surface of the eccentric 17.

In the embodiment of FIG. 10, radial forces which develop as a result of the action of the teeth of gears 18, 24 against each other are transmitted to the eccentric 17 by way of the cage 47 and wobble plate 48. Depending on the magnitude of the radial force acting upon the eccentric 17, the latter is shifted axially under the bias of the spring 50 or against the opposition of such spring. This ensures that radial play is eliminated during each stage of angular displacement of the shaft 12 as well as when the shaft is held in a selected angular position. Axial displacement of the shaft 12 takes place only while its angular position is being adjusted by a hand wheel or the like because sliding friction which then prevails is less pronounced than static friction between the wobble plate 48 and the eccentric 17 when the angular displacement of the shaft 12 is interrupted. The conicity of the eccentric 17 and of the internal surface 23 is preferably selected in such a way that the parts 17, 48 are in self-locking engagement as soon as the angular displacement of the shaft 12 is terminated. This guarantees that the shaft 12 cannot accidentally change its angular position and hence the inclination of the component 11 relative to the component 10. In other words, forces acting upon the back of the seat which embodies the hinge joint of FIG. 10 cannot change the inclination of the back except when such change in inclination is desired by the occupant of the seat or by another authorized person.

Figure 11:
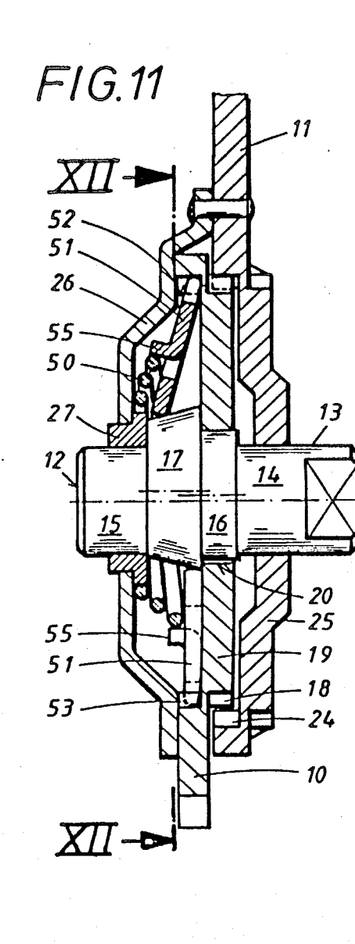
FIG. 11 is a sectional view of a hinge joint wherein the disc-shaped section of the gear on the first component comprises an annulus of levers which are pivotably mounted on the first section of the gear and are biased against the frustoconical eccentric.
Figure 12:
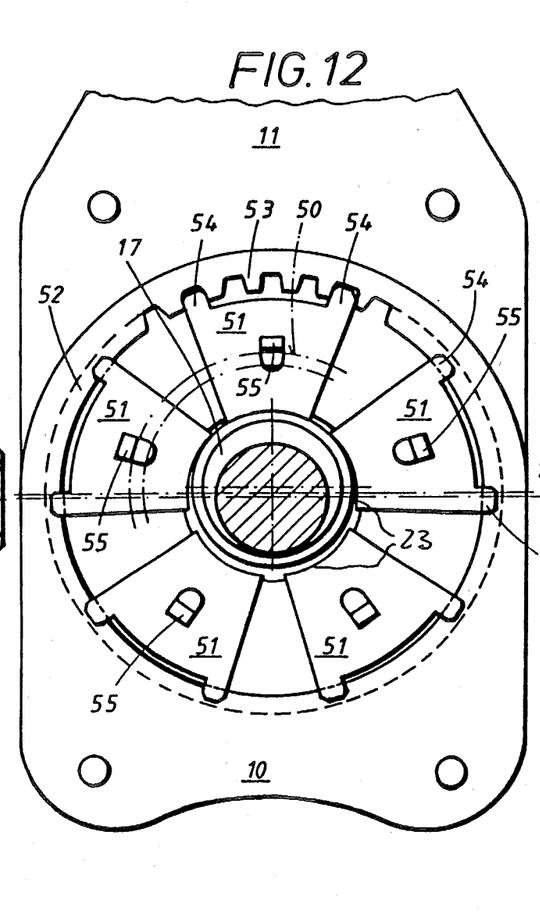
FIG. 12 is a sectional view as seen in the direction of arrows from the line XII—XII of FIG. 11.

FIGS. 11 and 12 illustrate a hinge joint wherein the second section of the gear 18 forming part of the stationary first component 10 comprises an annulus of levers 51 each of which has a radially outermost portion pivotally mounted on the adjacent portion of the first section 19 of the gear 18 and a radially innermost portion bearing against the eccentric 17 on the shaft 12. Such radially innermost portions of the levers 51 define the frustoconical internal surface 23 of the gear 18. The levers 17 can be said to constitute segments of a composite disc replacing the disc 34 of FIG. 5. The embodiment of FIGS. 11 and 12 utilizes a total of five equidistant levers 51 the radially outermost portions of which have teeth 54 mating with internal teeth 53 in the radially outermost portion of the section 19 of the gear 18. The teeth 53 are passive teeth which are formed in response to depression of the central portion of the component 10 so as to form the section 19 of the gear 18. The teeth 53 are provided at the inner side of an internal gear forming part of the component 10. The means for biasing the levers 51 against the eccentric 17 comprises a single conical coil spring 50 which reacts against the end plate 26 of the second component 11 and bears against suitably configured lugs 55 at the respective sides of the levers 51 so as to urge the composite internal surface 23 toward the larger-diameter end or base of the eccentric 17. The eccentric 16 is surrounded by the internal surface 20 of the first section 19 of the gear 18. The lugs 55 can constitute integral parts of the respective levers 51.

Figure 13:
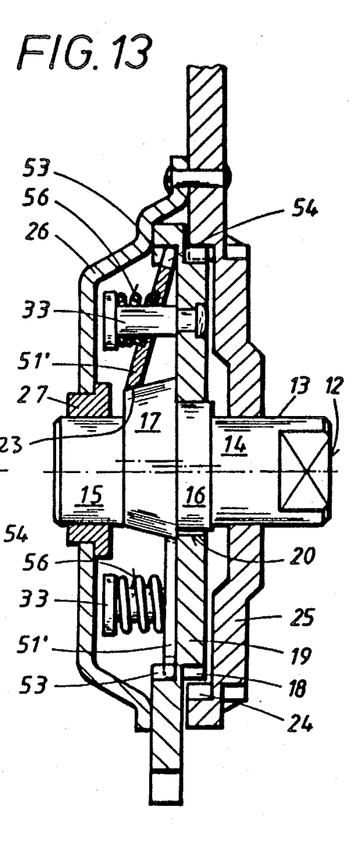
FIG. 13 is a sectional view of a hinge joint wherein each lever of the second section of the gear on the first component is biased by a discrete coil spring and is reciprocable along, as well as pivotable relative to, a discrete tie rod.

FIG. 13 illustrates a hinge joint which constitutes a slight modification of the hinge joint of FIGS. 11 and 12. The levers 51' are mounted in the internal gear (note the passive teeth 53 of the section 19) substantially in the same way as shown in FIGS. 11 and 12. The median portions of the levers 51' are traversed by discrete tie rods 33 in the form of rivets which are anchored in the section 19 and extend in parallelism with the shaft 12. The heads of the tie rods 33 are adjacent to the respective end convolutions of coil springs 56 which replace the spring 50 of FIG. 11 and serve to bias the respective levers 51' in a direction to maintain the composite internal surface 23 of the section including the levers 51' in contact with the peripheral surface of the eccentric 17 on the shaft 12. Each lever 51' is reciprocable along and is also pivotable relative to the respective tie rod 33.

Each of the levers 51 or 51' is caused to bear against the eccentric 17 with a force which ensures the elimination of play between the teeth of the gears 18, 19. The axial force which is exerted by the eccentric 17 upon the levers 51 or 51' may but need not be uniform, i.e., some of these levers can transmit or receive greater axial forces than the other levers. This accounts for different inclination (FIG. 13) of the levers relative to the plane of the section 19. Such different inclination is further attributable to the configuration of the eccentric 17.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A hinge joint, particularly for use between a stationary and a pivotable part of a seat in a motor vehicle, comprising a first component; a second component; and means for pivotally coupling said second component to said first component, including a shaft rotatably journalled in one of said components, a first gear provided on said first component and surrounding said shaft, a second gear provided on said second component, mating with said first gear and surrounding said shaft, a substantially cylindrical first eccentric provided on said shaft, and a substantially frustoconical second eccentric provided on said shaft, one of said gears having a first surface surrounding said first eccentric and a substantially frustoconical second surface surrounding said second eccentric, said coupling means further comprising means for biasing said second eccentric and said second surface axially of said shaft and against each other.

2. The hinge joint of claim 1, wherein the eccentricity of said second eccentric exceeds the eccentricity of said first eccentric, said first surface including a first portion having a radius corresponding to the radius of said first eccentric and a second portion disposed substantially diametrically opposite said first portion and having a radius which matches or exceeds the radius of said first eccentric.

3. The hinge joint of claim 1, wherein said second eccentric has a smaller-diameter end which is immediately adjacent said first eccentric, said smaller-diameter end having a first portion merging gradually into said first eccentric and a second portion disposed opposite said first portion and extending radially outwardly beyond said first eccentric.

4. The hinge joint of claim 1, wherein said first gear surrounds said eccentrics and said surfaces are provided in said first gear, said first surface being adjacent and being fixed relative to said second surface.

5. The hinge joint of claim 1, wherein said one gear includes a toothed first section, a disc-shaped second section and means for securing said second section to said first section, said first surface being provided in said first section and said second surface being provided in said second section.

6. The hinge joint of claim 1, wherein said one gear has a hub and said second surface is provided in said hub.

7. The hinge joint of claim 1, wherein said second eccentric has a smaller-diameter end and a larger-diameter end, said larger-diameter end being immediately adjacent said first eccentric.

8. The hinge joint of claim 7, wherein said one gear includes a first annular section and a second annular section movably mounted on said first annular section, said first surface being provided in said first section and said second surface being provided in said second section.

9. The hinge joint of claim 8, wherein at least a portion of said second section is movable toward and away from said first section in the axial direction of said shaft and said biasing means comprises means for biasing said second section in a direction to urge said second section against said second eccentric.

10. The hinge joint of claim 9, wherein said coupling means further comprises a plurality of tie rods provided on said first annular section in parallelism with said shaft, said second section being reciprocable along said tie rods and said tie rods being arranged to hold said second section against rotation relative to said first section.

11. The hinge joint of claim 10, wherein said biasing means comprises springs reacting against said tie rods and bearing against said second annular section.

12. The hinge joint of claim 1, wherein said one gear comprises a bearing and said first surface is provided in said bearing.

13. The hinge joint of claim 12, wherein said one gear comprises a sleeve which surrounds said shaft and said second surface is provided in said sleeve, said bearing being disposed in said sleeve.

14. The hinge joint of claim 1, wherein said one gear includes an annulus of rolling elements and said first surface is provided on said rolling elements.

15. The hinge joint of claim 1, wherein said one gear comprises an annular insert and said second surface is provided in said insert.

16. The hinge joint of claim 15, wherein said insert contains a plastic material.

17. The hinge joint of claim 15, wherein said insert contains a sintered metal.

18. The hinge joint of claim 1, wherein said one gear comprises a first section and a second section which is movable relative to said first section and constitutes a wobble plate, said first surface being provided in said first section and said second surface being provided in said second section, said first section comprising a cage for said second section and said biasing means comprising means for biasing said second section substantially in the axial direction of said shaft and against said second eccentric.

19. The hinge joint of claim 18, wherein said second eccentric comprises a larger-diameter base and a smaller-diameter end portion remote from said base, said biasing means comprising a substantially conical coil spring reacting against said first section and bearing against said second section to urge the second section toward the base of said second eccentric.

20. The hinge joint of claim 1, wherein said one gear comprises a first section and a composite second section including an annulus of levers having radially outermost portions pivotally connected to said first section and radially innermost portions defining said second surface, said biasing means comprising means for biasing said radially innermost portions against said second eccentric, said first surface being provided in said first section.

21. The hinge joint of claim 20, wherein said coupling means further comprises tie rods for said levers, said tie rods being rigid with said first section and parallel to said shaft, said levers being reciprocable along and pivotable relative to the corresponding tie rods.

22. The hinge joint of claim 21, wherein said biasing means comprises springs reacting against said tie rods and bearing upon the corresponding levers.

* * * * *